(No Model.)
F. B. MILES.
CLUTCHING AND RELEASING DEVICE FOR SHAFTS.
No. 266,865. Patented Oct. 31, 1882.
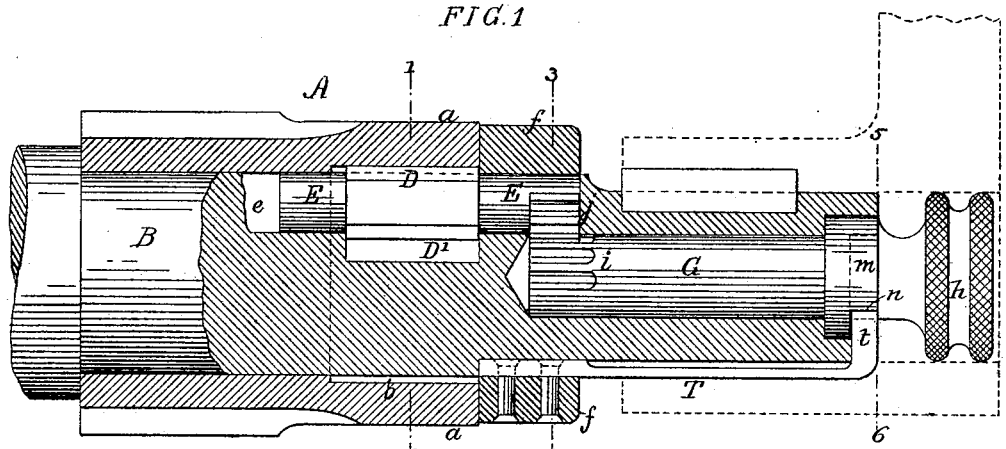
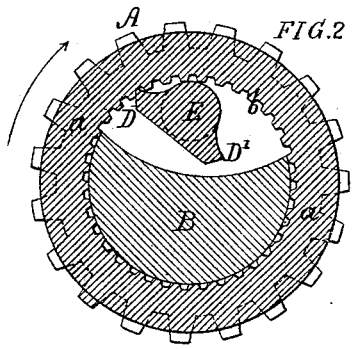
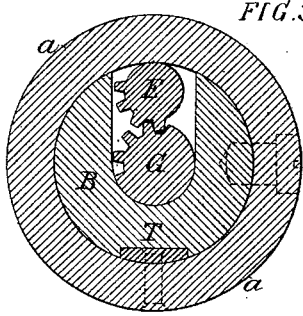
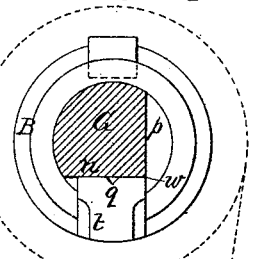
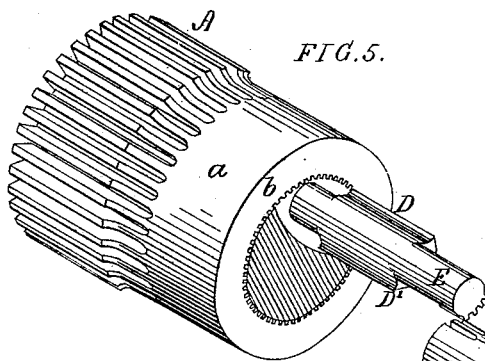
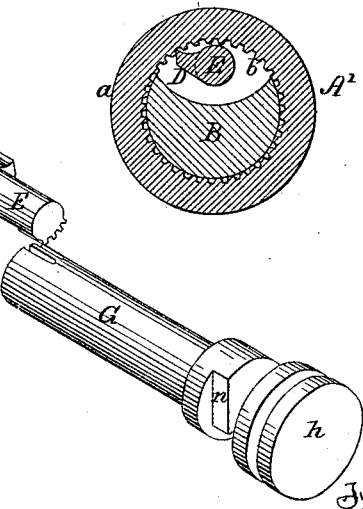
WITNESSES:
Harry Drury
Hamilton D. Turner
INVENTOR:
Fred. B. Miles
by his Attys.
Howsen and Sons

UNITED STATES PATENT OFFICE.

FREDERICK B. MILES, OF PHILADELPHIA, PENNSYLVANIA.

CLUTCHING AND RELEASING DEVICE FOR SHAFTS.

SPECIFICATION forming part of Letters Patent No. 266,865, dated October 31, 1882.

Application filed September 16, 1882. (No model.)

*To all whom it may concern:*

Be it known that I, FREDERICK B. MILES, a citizen of the United States, residing in Philadelphia, Pennsylvania, have invented certain Improvements in Clutching and Releasing Devices for Shafts, of which the following is a specification.

My invention consists of a device, fully described hereinafter, whereby a shaft may be intermittently rotated in either direction from an oscillated wheel, pulley, or arm, or stopped while the motion of the latter is continued, the device being also applicable as a clutch for connecting a driven wheel or pulley to or releasing it from a shaft; or a driven shaft may be connected to or released from a wheel or pulley or other object on the said shaft.

In the accompanying drawings, Figure 1 is a longitudinal section of the device: Fig. 2, a transverse section on line 1 2; Fig. 3, a transverse section on line 3 4; Fig. 4, a transverse section on line 5 6; Fig. 5, a perspective view illustrating the construction of the device, and Fig. 6, a section illustrating a modification of my invention.

In Figs. 1, 2, 3, 4, and 5 the device is illustrated as applied to that screw-shaft B of a planing-machine by which the tool-carrying slide is intermittently fed, A being a cog-wheel loose on the shaft, excepting under the circumstances explained hereinafter, and an oscillating movement being imparted to this shaft by mechanism which it is not necessary to explain or illustrate, as it forms no part of my invention. An internal cog-wheel is formed in the hub *a* of the wheel A, and to the teeth *b* of this internal wheel are adapted the pawls D D', two pawls being required in the application of my invention to a feed-shaft. The two pawls project from and form parts of a pivot-pin, E, which has its bearings in a recess, *e*, in the shaft B, one end of the pivot-pin being confined to its place by the hub of the wheel A and the other end by a collar, *f*, which is secured to the said shaft B. A spindle, G, has its bearing in the shaft B, and projects from the outer end of the same, the projecting end of the spindle being enlarged, and having serrated or milled ribs, so as to form a suitable knob or handle to be grasped by the hand. Teeth *i* are formed on the spindle G, and these gear into similar teeth, *j*, on the pivot E of the duplex pawl. The enlarged portion *m* of the spindle G is cut away so as to form two flat sides, *n* and *p*, at right angles to each other, as shown in Fig. 4. A spring, T, is secured to the shaft B, in the present instance through the medium of the collar *f*, to which the spring is riveted, and the upturned end of this spring bears against one or other of the flat sides *n* or *p* of the spindle G, or against the corner *w* (Fig. 4) of the spindle, in which case the said corner occupies a notch, *q*, in the said upturned edge of the spring, the spindle being readily adjusted to either of these positions by manipulating the handle *h*. When the spindle has been adjusted to the position shown in Fig. 4, so that the spring shall bear against the flat side *n*, the pawl D will be in action, and when the spindle has been so turned that the spring bears against the flat side *p* the pawl D' will be in action, and when the spindle has been adjusted so that the corner *w* is retained in the notch *q* of the spring neither of the pawls will be in action, and the shaft B is therefore free to be moved in either direction by a crank, such as shown by dotted lines, or by other means.

Supposing the wheel A to be moving in the direction of the arrow, Fig. 2, the shaft B must, through the medium of the pawl D, be turned in the same direction; but when the wheel turns in the contrary direction the pawl will yield to the teeth of the internal wheel and there will be no movement of the shaft. When the pawl D' is in action, however, and the wheel A is moving in the direction of the arrow there will be no movement of the shaft B in the same direction; but when the wheel A is moved in a direction contrary to that pointed out by the arrow the shaft will be moved with it. It will thus be seen that while a continuous oscillating motion is imparted to the wheel A the shaft B may be intermittently rotated in either direction or stopped by the simple manipulation of the handle *h* of the spindle G.

The application of my invention is not restricted to the screw-shafts for feeding the tool-holding slides of planing-machines. The device, for instance, may be used for stopping or starting a wheel or pulley on a driven shaft, or for stopping and starting a shaft driven through the medium of a wheel or pulley, the main aim of my invention being to effect the desired purposes by means of a spindle contained within the shaft and constructed for convenient manipulation. Thus, in Fig. 6, A' may be the hub of a driven wheel or pulley, and there may be a single pawl, the action or non-action of which depends upon the manipulation of the spindle G, the wheel or pulley running freely on the shaft when the pawl is out of action and one or other of the teeth of the internal wheel catching against the pawl when it is properly adjusted, and thereby causing the shaft to turn with the wheel or pulley.

The application of this device to a driven shaft for the purpose of throwing a wheel or pulley out of gear with the said shaft will be readily understood without explanation.

I claim as my invention—

1. Stopping and starting mechanism in which the following elements are combined, namely: a shaft, B, a spindle, G, which has its bearing in and which projects from the end of the shaft, a wheel or pulley adapted to the shaft and provided with ratchet-teeth, and a pawl or pawls adapted to be actuated by the said spindle G, all substantially as set forth.

2. The combination of the shaft B, pawl-controlling shaft G, having two flat sides, $n$ and $p$, and a spring, T, secured to the said shaft B, substantially as specified.

3. The combination of the shaft B, the wheel A with teeth $b$, the pawl-carrying pin E, the spindle G, projecting from the end of the shaft B, and gearing for connecting the pin E and spindle G, as set forth.

In testimony whereof I have signed my name to this specification in the presence of two subscribing witnesses.

FREDK. B. MILES.

Witnesses:
 HARRY DRURY,
 HARRY SMITH.